United States Patent [19]

Sakai et al.

[11] 3,844,980

[45] Oct. 29, 1974

[54] CATALYST FOR USE IN PURIFICATION OF EXHAUST GASES

[75] Inventors: Toshiyuki Sakai, Funabashi; Yutaka Ushimaru, Tokyo, both of Japan

[73] Assignee: Mitsui Mining & Smelting Co. Ltd., Tokyo, Japan

[22] Filed: Dec. 29, 1972

[21] Appl. No.: 320,330

[30] Foreign Application Priority Data
Dec. 28, 1971  Japan................................ 47-2226

[52] U.S. Cl.............. 252/466 B, 252/461, 252/464, 252/465, 252/466 J, 252/471, 423/213
[51] Int. Cl............................................. B01j 11/08
[58] Field of Search........ 252/464, 466 B, 471, 461, 252/466 J, 465; 423/213.5

[56] References Cited
UNITED STATES PATENTS

| | | | |
|---|---|---|---|
| 3,436,433 | 4/1969 | Lester................................ | 252/465 |
| 3,470,105 | 9/1969 | Briggs et al......................... | 252/465 |
| 3,498,927 | 3/1970 | Stiles................................ | 252/466 B |
| 3,501,546 | 3/1970 | Dubeck............................. | 260/676 R |
| 3,579,569 | 5/1971 | Montgomery et al........ | 252/466 P X |
| 3,586,730 | 6/1971 | Michaels et al.................... | 252/465 |
| 3,649,706 | 3/1972 | Lester.............................. | 252/466 B |
| 3,649,707 | 3/1972 | Lester.............................. | 252/466 B |

*Primary Examiner*—Daniel E. Wyman
*Assistant Examiner*—A. P. Demers
*Attorney, Agent, or Firm*—Woodhams, Blanchard and Flynn

[57] ABSTRACT

A catalyst prepared by applying to at least one oxide of transition metals coming within the 4th Period of the Periodic Table, a small amount of at least one metal belonging to Group 8 or Group 1B, and to the 5th Period or 6th Period of the Periodic Table. The catalyst is effective in converting carbon monoxide and hydrocarbons contained in exhaust gases into harmless components.

2 Claims, No Drawings

CATALYST FOR USE IN PURIFICATION OF EXHAUST GASES

BACKGROUND OF THE INVENTION a. Field of the Invention

The present invention relates to a catalyst for an oxidation reaction which is capable of purifying exhaust gases containing carbon monoxide and hydrocarbons arising from combustion devices, particularly from automobile engines, by converting these harmful components into harmless components.

b. Description of the Prior Art

A catalyst for use in the purification of exhaust gases arising from automobiles is required to be always capable of displaying a high activity under conditions of wide range inasmuch as the composition, temperature and so forth of the gases to be treated are subject to incessant fluctuations according to the operating conditions of automobiles, and it is therefore required to possess a high efficiency under such severe conditions as are beyond the common knowledge regarding ordinary catalysts for use in the chemical industry. To enumerate the important properties among those required of catalysts for use in the purification of automobile exhaust gases, they are as follows: it must have activity even at a low temperature such as at the time of starting the engine; it must have heat resistance enough to stand high temperature to which it may be exposed at the time of running at high speed; it must be capable of displaying high activity even under widely fluctuating conditions in respect of composition and temperature of the gases; it must be capable of holding activity for a long period of time, that is, it must have a long span of life; and so forth.

As catalysts for use in the purification of automobile exhaust gases known heretofore, there are noble metal catalysts prepared by making an alumina carrier carry a noble metal such as platinum, palladium, etc. thereon, base metal oxide catalysts prepared by combining base metal oxides such as copper oxide, iron oxide, manganese oxide, chromium oxide, etc. in various ways, and the like. These conventional catalysts, however, are still imperfect as catalysts for practical use inasmuch as they have such defects as follows. That is, as to the conventional noble metal catalyst, though it has admittedly been much appreciated as a highly efficient catalyst for use in some quarters because it not only possesses activity at low temperature but also displays a high activity, the most serious defect of it is that it is sensitive to catalytic poisons and is apt to lose its activity easily due to the effect of lead, halogen, carbon and the like derived from gasoline, so that a long span of life in practical use thereof can hardly be expected. Besides, because of the world-wide scarcity of noble metal resources, the provision of noble metal catalysts for automobiles being mass-produced year after year would be confronted with a difficult problem in respect of resources, and, at the same time, it would involve practically unstable factors such as the soaring price of noble metals to be anticipated from an increase in demand. As to the base metal oxide catalysts, on the other hand, though it admittedly is highly resistant to catalytic poisons and is advantageous from the viewpoint of resources and cost of product, it displays an insufficient activity at low temperature and is poor in heat resistance, so that it has such defects that, when exposed to a high temperature, it shows change in quality, decrease in specific surface area, etc., readily leading to deterioration of the catalytic efficiency thereof.

SUMMARY OF THE INVENTION

The inventors have energetically continued their studies with a view to overcoming for the aforesaid defects of catalysts for use in the purification of automobile exhaust gases and have divised a highly efficient catalyst substantially free of any troubles during practical use. The catalyst under the present invention comprises at least one base metal oxide as catalytic component thereof, and it is prepared by making particles of said oxide or oxides carry a very small amount of at least one noble metal as an activating agent on their surfaces. This composition contributes to enhancing the activity of the present catalyst and bringing about a unique effect of lengthening the life span thereof, thereby making it suitable as a practical catalyst having all necessary properties.

DESCRIPTION OF THE PREFERRED EMBODIMENTS

The base metal oxides to be employed for the present invention as the essential component which displays catalytic action include oxides of transition metals coming within the 4th Period of the Periodic Table, such as Ti, V, Cr, Mn, Fe, Co, Ni, Cu, Zn, etc. (hereinafter generically called base metal oxides) and these oxides are employed singly or in the form of a mixture comprising two or more of them. In addition, particles of the aforesaid oxides which are plated with a metal or metals capable of promoting the catalytic action thereof, such as Cu, Ni, Co, Cr, Ag, etc., by the electroless plating method are also applicable. As the noble metals for use in the present invention, at least one of those metals belonging to Group 8 or Group 1B, and to the 5th Period or the 6th Period of the Periodic Table, namely, Ru, Rh, Pd, Os, Ir, Pt, Ag and Au (hereinafter generically called noble metals) is employed.

As the means for making particles of the foregoing oxide or oxides carry a very small amount of said noble metal or metals on their surfaces, there are known various methods. For instance, there is a method comprising dipping one or a mixture consisting of two or more of said oxides in an aqueous solution containing dissolved therein one or more kinds of soluble salts of said noble metals, drying thereafter, forming the thus treated oxide or oxides into moldings of the desired shape, and heating said moldings in an atmosphere of a reducing gas like hydrogen to thereby reduce the noble metal salts adhering to the surfaces of the oxide particles and convert same to the metals. In this process, the steps of dipping in said aqueous solution of noble metal salts and reducing may be performed either prior to or after the molding step. In addition, when it is necessary to increase the strength of the resulting moldings, for instance, an appropriate amount of a so-called carrier component such as $Al_2O_3$, $SiO_2$, $MgO$, etc. may be mixed with the aforesaid oxides. This mixing may be performed either prior to or after the step of dipping in said aqueous solution of noble metal salts. The above method is, so to speak, a gas-phase reducing method. In addition to this, a method which is similar to it except that the reduction is performed by using such a reducing liquid such as formalin, and a quite different method employing electroless plating can also be applied. Among the various mixtures of metal oxides applicable to the present invention, one which can display the most conspicuous purification efficiency is a mixture composed of 5 to 10 parts by weight of manganese sesquioxide, 10 to 20 parts by weight of copper oxides in CuO equivalent, 5 to 10 parts by weight of ferric oxide, 60 to 80 parts by weight of γ-alumina and 1 to 5 parts by weight of magnesium oxide. In this composition, the purification efficiency can be further promoted by making at least one of the catalytic oxides, i.e. manganese sesquioxide, copper oxides and ferric oxide, carry 1 to 5 wt.% copper relative to said oxide or oxides plated on the surfaces thereof by means of the electroless plating process.

To explain the mechanism of the action of the catalyst according to the present invention, it is presumed that the noble metal or metals per se employed for the present invention does not display a catalytic effect, but it acts as an activating agent to highly elevate the catalytic efficiency of the base metal oxide or oxides constituting the catalytic component of the catalyst. Therefore, said noble metal or metals starts demonstrating its effect even when it is present in an amount of 0.001 wt.% relative to the total amount of base metal oxides. Nevertheless, it is inadvisable to make the base metal oxides carry noble metal in excess of 0.2 wt.% in light of the fact that if a higher quantity is present the resulting catalyst comes to have properties approximating those of conventional noble metal catalysts and it has various defects peculiar to noble metal catalysts, for example, it is easily poisoned to show deterioration of efficiency, gives rise to troubles with respect to resources and cost of product, and so forth, which disqualify it for practical use. Consequently, from both the viewpoints of efficiency and cost, the optimum amount of noble metal or metals is in the range of from 0.001 to 0.2 wt.% or thereabout. As to the effects to be displayed by the present catalyst or the advantages thereof, deterioration of the catalytic efficiency is checked, the life span of the catalyst is remarkably prolonged, a very small amount of noble metal or metals employed therefor acts as a kind of igniting agent in the oxidation reaction so as to display a high catalytic activity at low temperature, and a higher activity than that of conventional oxide catalysts is displayed over a wide range of temperature. These effects are considered to be attributable to the generation of special active points on the interfaces between said base metal oxides and the noble metals carried thereby. Therefore, the amount of catalyst employed can be reduced, and, accordingly, the heat capacity thereof diminishes, so that the present catalyst, in view of its high activity at low temperature, displays a high efficiency at the time of cold start of the engine. Besides, inasmuch as the present catalyst carries an extremely small amount of noble metals as compared with conventional noble metal catalysts, it gives rise to no trouble with respect to resources and cost.

The most conspicuous feature displayed by the catalyst according to the present invention is that deterioration of the efficiency of the catalyst is checked and the durability of the catalyst is remarkably enhanced. The exact reason for this effect is yet to be clarified, but it may be theorized as follows: because noble metals having resistance to high temperature are deposited on the surfaces of the base metal oxide particles, contact between metal oxide particles is lessened, so that various causes for deterioration of their catalytic properties, e.g., the phenomenon of oxide grains getting coarse due to recrystallization thereof under the influence of high temperature, formation of compounds of oxides, or diminution of specific surface area attendant upon these phenomena, can be effectively avoided. As for those components of exhaust gases which act as poisons to noble metals, they are absorbed and eliminated effectively by virtue of the base metal oxides present in large quantities, so that the noble metals are safeguarded and their activating efficiency remains free of impairment.

Hereunder will be given some concrete examples embodying the present invention.

Example 1.

Powders of manganese sesquioxide and ferric oxide were respectively dipped in an aqueous solution comprising 15 g/l of stannous chloride and 10 cc/l of hydrochloric acid at room temperature for 2 minutes, washed by water thereafter, subsequantly dipped in an aqueous solution comprising 2 g/l of palladium chloride and 70 cc/l of hydrochloric acid at room temperature for 2 minutes, washed by water again and then dried, whereby there were obtained powders of manganese sesquioxide and ferric oxide carrying 0.002 wt.% of metallic palladium thereon. 40 parts by weight of manganese sesquioxide and 30 parts by weight of ferric oxide both treated as above were mixed with 30 parts by weight of γ-alumina and the resulting mixture was subjected to molding with a compression molding press under a pressure of 2 t/cm$^2$, followed by 2 hours' sintering at 700°C, whereby a molded catalyst was obtained.

Example 2.

A powder mixture consisting of 40 wt.% of cupric oxide, 10 wt.% of chromium trioxide and 50 wt.% of γ-alumina was dipped in an aqueous solution comprising 2 g/l of chloroplatinic acid at room temperature for 10 minutes and dried thereafter at 110°C. The thus treated powder mixture was then subjected to compacting under a pressure of 1 t/cm$^2$, followed by 1 hour's presintering at 500°C and 30 minutes' reduction and sintering with a hydrogen current at 700°C subsequent thereto, whereby a molded catalyst carrying 0.04 wt.% of platinum thereon was obtained.

Example 3.

A powder mixture consisting of 30 wt.% of manganese sesquioxide, 30 wt.% of cupric oxide, 30 wt.% of γ-alumina and 10 wt.% of magnesium oxide was dipped in an aqueous solution comprising 1 g/l of chloroplatinic acid and 1 g/l of palladium chloride at room temperature for 5 minutes, subsequently dipped in another aqueous solution comprising 300 cc/l of 33% formalin and 400 g/l of potassium hydroxide at 60°C for 30 minutes for reduction treatment, washed by water and then dried.

Next, the thus treated mixture was subjected to compacting under a pressure of 2 t/cm$^2$, followed by 2 hours' sintering at 700°C, whereby a molded catalyst carrying 0.01 wt.% of platinum and 0.01 wt.% of palladium thereon was obtained.

Example 4.

A powder mixture consisting of 20 wt.% of manganese sesquioxide, 20 wt.% of cupric oxide, 10 wt.% of ferric oxide, 10 wt.% of chromium trioxide and 40 wt.% of γ-alumina was subjected to compacting under a pressure of 1 t/cm$^2$, followed by 1 hour's sintering at 700°C, 10 minutes' dipping in an aqueous solution comprising 0.5 g/l of chloroplatinic acid and thereafter drying at 110°C. Subsequently, the thus treated mixture was reduced by heating at 700°C in hydrogen current for 10 minutes, whereby a molded catalyst carrying 0.01 wt.% of platinum thereon was obtained.

Example 5.

A powder mixture consisting of 20 wt.% of manganese sesquioxide, 20 wt.% of ferric oxide, 20 wt.% of zinc oxide, 5 wt.% of nickel monoxide, 5 wt.% of cobalt monoxide and 30 wt.% of γ-alumina was dipped in an aqueous solution comprising 15 g/l of stannous chloride and 10 cc/l of hydrochloric acid at 40°C for 1 minute, washed by water thereafter, and again dipped in another aqueous solution comprising 1 g/l of silver chloride at 40°C for 1 minute. After washing by water and drying, the mixture treated as above was subjected to compacting under a pressure of 2 t/cm² and 3 hours' sintering at 700°C, whereby a molded catalyst carrying 0.005 wt.% of silver thereon was obtained.

Example 6.

A powder mixture prepared by mixing 10 wt.% of manganese sesquioxide, 17 wt.% of copper oxide, 10 wt.% of ferric oxide, 60 wt.% of γ-alumina and 3 wt.% of magnesium oxide was subjected to compacting under a pressure of 2 t/cm², followed by sintering at 700°C for 3 hours, dipping in an aqueous solution comprising 1 g/l of palladium chloride and reduction at 250°C in hydrogen current for 10 minutes, whereby a molded catalyst carrying 0.01 wt.% of palladium thereon was obtained.

cc/l of hydrochloric acid at room temperature for 2 minutes and then washed by water. Next, it was dipped in another aqueous solution comprising 1 g/l of silver nitrate at 40°C for 1 minute. After washing by water again, it was dipped in an electroless copper plating bath comprising 20 g/l of copper sulfate, 70 g/l of potassium sodium tartrate, 9 g/l of caustic soda, 4 g/l of sodium carbonate and 20 g/l of 37% formalin at room temperature for 30 minutes, whereby it was made to carry copper as plated thereon in the amount of 0.5 wt.% relative to manganese sesquioxide. Subsequently, by applying the same mixing ratio as well as procedure as in Example 6 except for employing the thus processed manganese sesquioxide, a molded catalyst carrying 0.01 wt.% of palladium thereon was obtained.

Example 8.

By conducting an endurance test using a 1,600 cc 4-cylinder engine under driving conditions equivalent to those of running at 80 km/hr upon charging catalysts obtained in Examples 1 to 7 and nine kinds of comparative catalysts individually in the exhaust system of said engine, the exhaust gas purification efficiency of these catalysts at the initial stage of use and after 200 hours' use was respectively examined. As a result, compared with those base metal oxide catalysts not carrying noble metal and noble metal catalysts consisting of alumina carrier carrying noble metal only, the present catalysts showed less deterioration of efficiency and excellent effects in respect of the time required for cold start as well as the purification ratio after 200 hours' use, and proved to have a conspicuous durability.

Table showing Performances of Catalysts

| No. | Composition of catalyst | | at initial stage | | | after 200 hrs' use | | |
|---|---|---|---|---|---|---|---|---|
| | | | time required for cold start | purification ratio | | time required for cold start | purification ratio | |
| | | | | CO% | HC% | | CO% | HC% |
| 1 | catalyst in | Example 1 | 4'00" | 97 | 82 | 4'15" | 94 | 77 | |
| 2 | do. | Example 2 | 3'30" | 98 | 83 | 3'45" | 95 | 79 | catalysts |
| 3 | do. | Example 3 | 4'00" | 98 | 85 | 4'15" | 95 | 80 | under |
| 4 | do. | Example 4 | 3'30" | 99 | 87 | 4'45" | 96 | 83 | present |
| 5 | do. | Example 5 | 4'00" | 98 | 81 | 4'30" | 95 | 75 | invention |
| 6 | do. | Example 6 | 3'15" | 98 | 88 | 3'30" | 97 | 85 | |
| 7 | do. | Example 7 | 3'00" | 99 | 90 | 3'15" | 98 | 88 | |
| 8 | same as No. 1 excepting that Pd was not carried | | 5'00" | 96 | 75 | 6'30" | 55 | 38 | |
| 9 | same as No. 2 excepting that Pt was not carried | | 4'30" | 97 | 77 | 6'00" | 65 | 45 | |
| 10 | same as No. 3 excepting that Pt and Pd were not carried | | 5'00" | 96 | 82 | 6'30" | 63 | 43 | comparative catalysts |
| 11 | same as No. 4 excepting that Pt was not carried | | 4'30" | 98 | 84 | 6'00" | 70 | 55 | |
| 12 | same as No. 5 excepting that Ag was not carried | | 5'00" | 96 | 70 | 6'45" | 56 | 40 | |
| 13 | same as No. 6 excepting that Pd was not carried | | 4'30" | 97 | 80 | 5'15" | 75 | 60 | |
| 14 | same as No. 7 excepting that Pd was not carried | | 4'30" | 98 | 85 | 5'00" | 79 | 65 | |
| 15 | 0.5% Pt-Al₂O₃ pellet | | 3'30" | 99 | 85 | 4'30" | 79 | 61 | |
| 16 | 0.5% Pd-Al₂O₃ pellet | | 3'30" | 98 | 83 | 4'30" | 75 | 55 | |

Example 7.

Among the components of the mixture in Example 6, only the manganese sesquioxide was treated for electroless copper plating as follows. That is, manganese sesquioxide powder was first dipped in an aqueous solution comprising 15 g/l of stannous chloride and 10

(Remarks) time required for cold start:

time required for attaining 500°C in temperature of catalyst bed when driving the engine under conditions equivalent to those of running at 80 km/hr. subsequent to 2 minutes idling.

space velocity: 25,000 Hr⁻¹ temperature of catalyst bed at the time of measuring purification ratio: 550°C $\overline{HC}$: hydrocarbons in n-hexane equivalent As discussed in the foregoing, the catalyst under the present invention can display a marvelous effect, and, putting all merits thereof such as excellent efficiency, easiness of preparation and no trouble in respect of resources and cost together, it is best suited for use as practical catalyst and is much contributive to preventing air pollution.

What is claimed is:

1. A catalyst for use in purifying exhaust gases from combustion operations, comprising (A) a mixture of metal oxide particles consisting of (1) 5 to 10 parts by weight of $Mn_2O_3$, (2) 10 to 20 parts by weight of CuO and/or $Cu_2O$ in CuO equivalent, (3) 5 to 10 parts by weight of $Fe_2O_3$, (4) 60 to 80 parts by weight of $\gamma$-$Al_2O_3$ and (5) 1 to 5 parts by weight of MgO, B. said particles of (1), (2) and (3) having deposited thereon from 0.001 to 0.2 percent by weight, based on the weight of (1), (2) and (3), of at least one metal selected from the group consisting of Ru, Rh, Pd, Ag, Os, Ir, Pt and Au.

2. A catalyst according to claim 1, wherein the particles of at least one of (1), (2) and (3) have plated thereon from 1 to 5 percent by weight of copper.

* * * * *